(12) United States Patent
Kosowski (10) Patent No.: US 12,271,255 B2
(45) Date of Patent: Apr. 8, 2025

(54) PRESS TO DOCUMENT APPLIANCE ISSUE DETECTION

(71) Applicant: WHIRLPOOL CORPORATION, Benton Harbor, MI (US)

(72) Inventor: Piotr Kosowski, Wroclaw (PL)

(73) Assignee: WHIRLPOOL CORPORATION, Benton Harbor, MI (US)

( * ) Notice: Subject to any disclaimer, the term of this patent is extended or adjusted under 35 U.S.C. 154(b) by 91 days.

(21) Appl. No.: 18/192,465

(22) Filed: Mar. 29, 2023

(65) Prior Publication Data

US 2024/0330089 A1 Oct. 3, 2024

(51) Int. Cl.
*G06F 11/00* (2006.01)
*G06F 11/07* (2006.01)

(52) U.S. Cl.
CPC ...... *G06F 11/0736* (2013.01); *G06F 11/0772* (2013.01)

(58) Field of Classification Search
CPC ............ G06F 11/0736; G06F 11/0766; G06F 11/0772; G06F 11/3013; G06F 11/3058; G06F 11/3089
See application file for complete search history.

(56) References Cited

U.S. PATENT DOCUMENTS

| | | | |
|---|---|---|---|
| 8,217,781 B2 | 7/2012 | Ebrom et al. | |
| 9,772,136 B2 | 9/2017 | Shim et al. | |
| 10,107,849 B2 | 10/2018 | Jeon | |
| 10,552,249 B1 * | 2/2020 | Johansson | G06F 11/079 |
| 2013/0238283 A1 | 9/2013 | Kwon et al. | |
| 2016/0028556 A1 | 1/2016 | Ebrom et al. | |
| 2021/0111918 A1 | 4/2021 | Yoon et al. | |

* cited by examiner

*Primary Examiner* — Philip Guyton
(74) *Attorney, Agent, or Firm* — BROOKS KUSHMAN P.C.

(57) ABSTRACT

An issue reporting function of an appliance is provided. Responsive to user activation of a report feature indicating that an issue is being experienced by the appliance, appliance signals and state information are periodically captured into data records. Responsive to deactivation of the report feature, capturing of the appliance signals and the state information is discontinued. The data records are sent to a remote device for analysis.

20 Claims, 9 Drawing Sheets

PRESS TO DOCUMENT APPLIANCE ISSUE DETECTION

TECHNICAL FIELD

Aspects of the present disclosure generally relate to a report feature for an appliance that records data from sensors when an issue is occurring, to allow for the sensor data to be evaluated.

BACKGROUND

A customer may review a purchased product. Many reviews are positive, such as a five out of five star rating. Other customers may report lower ratings. Generally, customers give insufficient information to allow for identification of the reason for the rating.

SUMMARY

In one or more illustrative examples, an appliance implementing an issue reporting function includes a controller configured to, responsive to user activation of a report feature indicating that an issue is being experienced by the appliance, periodically capture appliance signals and state information into data records; responsive to deactivation of the report feature, discontinue the capture of the appliance signals and the state information; and send the data records to a remote device for analysis.

In one or more illustrative examples, a method for implementing an issue reporting function of an appliance includes responsive to user activation of a report feature indicating that an issue is being experienced by the appliance, periodically capturing appliance signals and state information into data records; responsive to deactivation of the report feature, discontinuing the capturing of the appliance signals and the state information; and sending the data records to a remote device for analysis.

In one or more illustrative examples, a non-transitory computer-readable medium includes instructions for implementing an issue reporting function for an appliance that, when executed by a controller of the appliance, cause the controller to perform operations including to responsive to user activation of a report feature indicating that an issue is being experienced by the appliance, periodically capture appliance signals and state information into data records; responsive to deactivation of the report feature, discontinue the capture of the appliance signals and the state information; and send the data records to a remote device for analysis.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications.

When a customer reports an issue of a product at home, oftentimes there is limited documentation of the issue to help an engineer diagnose and solve the issue. This lack of documentation of the issue (e.g., lack of documentation of video, sound, temperatures conditions, etc., when the issue occurred) and inability of the service technician to fully understand the circumstances at the customer site may increase the difficulty in diagnosing, understanding, and correcting the issue.

In some cases, the customer may call a service technician to have the issue corrected. The service technician, in turn, may arrive at the customer site several days later. In the case of an intermittent issue, it is likely that the issue may have at least temporarily disappeared by the time service personnel arrive. Thus, the issue may not be replicated when the service technician is present. This applies often to sound and vibrations issues, in an example. This may also apply for cases where an item inside the appliance is blocking internal airflow but is moved before the technician arrives.

A report feature may be included in the appliance to allow for the saving of specific conditions when the issue is occurring. These conditions may be saved for post-processing and evaluation. The conditions may include the reporting of information from available sensors of the appliance. These sensors may include temperature sensors, power consumption loggers, speed of compressor, fans, etc.) to enable saving a specific condition the issue is occurring to be registered for post-processing and evaluation.

The report feature may be enhanced with additional sensors. In an example, the appliance may include or otherwise access audio/video recording sensors to document further details of the issue. These additional sensors may include microphone and/or cameras, as some possibilities, to capture aspects such as emanating sounds and/or a layout of items in the appliance. These additional sensors may further aid in the diagnosis of issues such as for noise and vibrations issues.

At the time when the issue is occurring, the customer may press a button to activate the report feature. This activation may trigger a controller of the appliance to register the current conditions of the appliance. If the issue stops occurring, the customer may similarly use the similar button to indicate the issue is no longer occurring.

In an example, the issue registering procedure may utilize a pre-defined a maximum time of registration, after which it would stop registering automatically. The timeframe for the registration may be preset by service personnel or an engineer.

Figure 1:
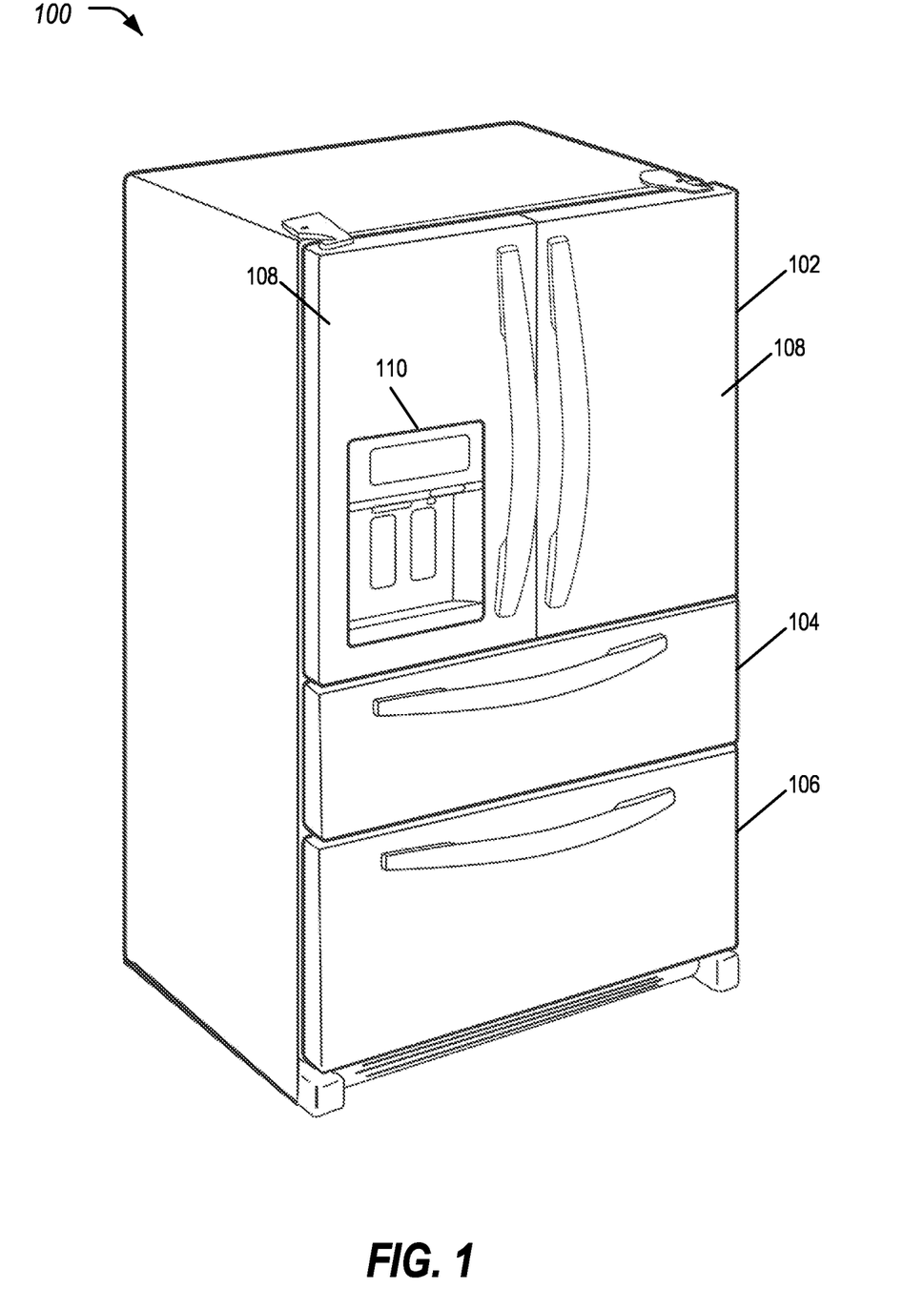
FIG. 1 illustrates an example refrigerator implementing issue reporting functionality.

FIG. 1 illustrates an example refrigerator 100 implementing issue reporting functionality. The refrigerator may be of the French-door bottom mount type, but it is understood that this disclosure could apply to any type of refrigerator, such as a side-by-side, two-door bottom mount, or top-mount type. As shown in FIG. 1, the refrigerator 100 may include a number of storage compartments. The storage compartments may include a fresh food compartment 102, a drawer compartment 104, and a freezer compartment 106. Each of the compartments 102, 104, 106 may be divided by a mullion or other divider configured to insulate the compartments 102, 104, 106 from one another for independent temperature control. Additionally, one or more of the compartments 102 may be controlled to adjust in temperature such that the compartments 102 may be implemented to store frozen or fresh items.

The fresh food compartment 102 may be accessed by opening one or both fresh food compartment doors 108. The freezer compartment 106 may be accessed by pulling the freezer handle outwards as a drawer. The drawer compartment 104 may similarly be accessed by pulling the drawer handle.

A control panel 110 may be integrated into one of the fresh food compartment doors 108. The control panel 110 may include digital controls or an external display to allow users to adjust the temperature and monitor the status of the refrigerator 100. Using the control panel 110, the user may be able to interact with various functions of the refrigerator 100.

Figure 2:
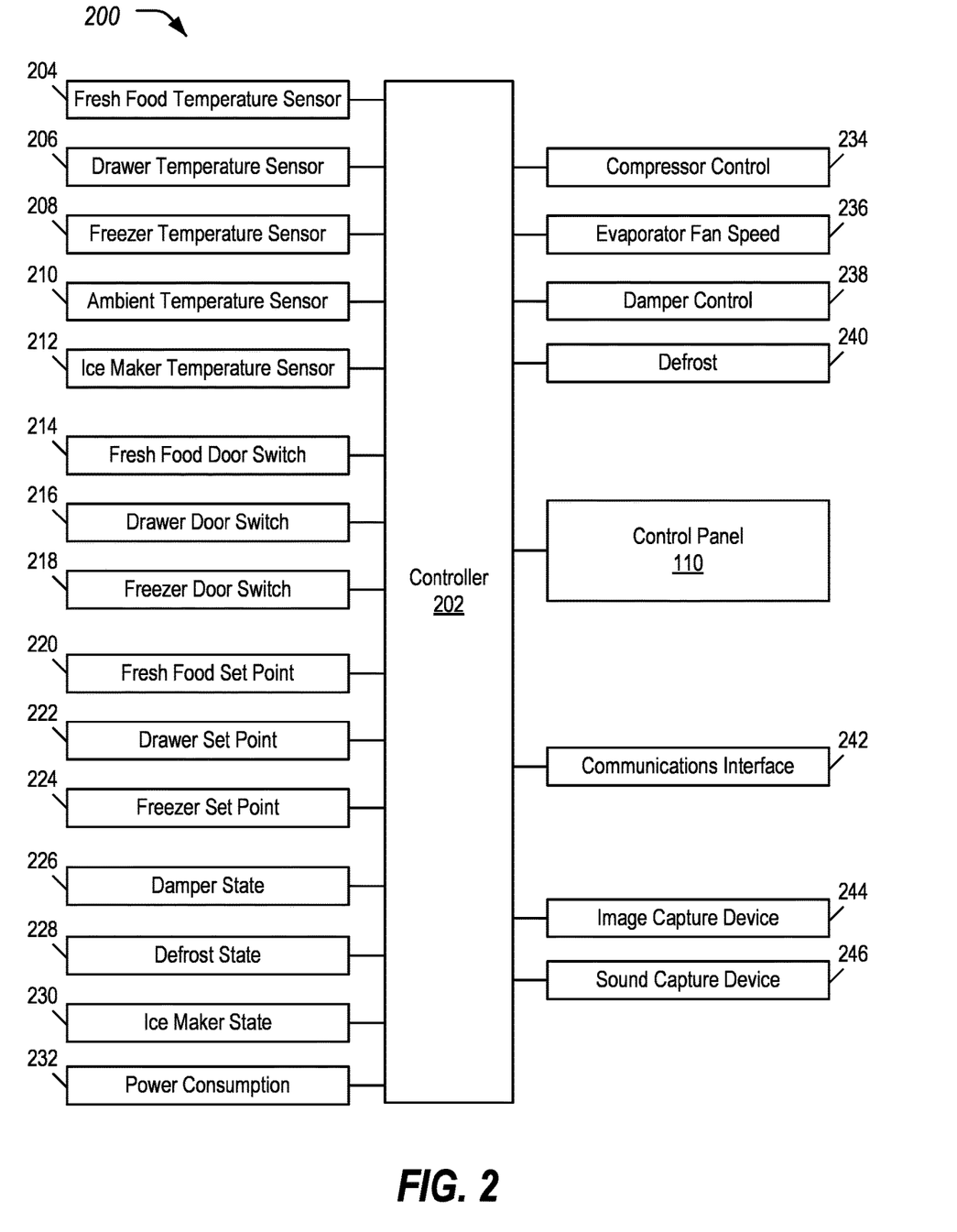
FIG. 2 illustrates a schematic view of operation of a controller of the refrigerator of FIG. 1.

FIG. 2 illustrates a schematic view 200 of operation of a controller 202 of the refrigerator 100. Generally, the refrigerator 100 operates by circulating cool air throughout the interior using a refrigeration system that includes a compressor, condenser coils, an evaporator, and a refrigerant. The compressor pumps refrigerant between the condenser and evaporator coils. The condenser coils release heat to the outside while the evaporator coils absorb heat from the interior of the refrigerator 100, creating a cooling effect.

The controller 202 includes electronics configured to receive inputs from various sensors of the refrigerator 100 and manages the operation of the compressor, fans, and other components. Based on the sensor inputs, the controller 202 may adjust the cooling capacity of the refrigeration system and ensure that the desired temperature is maintained within the refrigerator 100.

The controller 202 may receive state information regarding a plurality of inputs. For example, the controller 202 may be electrically connected to various temperature sensors, such as a fresh food temperature sensor 204 configured to measure the temperature inside the fresh food compartment 102, a drawer temperature sensor 206 configured to measure the temperature inside the drawer compartment 104, a freezer temperature sensor 208 configured to measure the temperature inside the freezer compartment 106, an ambient temperature sensor 210 configured to measure the room temperature outside the compartments 102, and an ice maker temperature sensor 212 configured to measure the temperature of the ice maker, if so equipped.

The controller 202 may also receive state information from various user-movable components of the refrigerator 100. For example, the controller 202 may receive state signals from a fresh food compartment door switch 214 for monitoring whether the fresh food compartment doors 108 are open or closed, a drawer compartment switch 216 for monitoring whether the drawer compartment 104 is open or closed, a freezer compartment switch 218 for monitoring whether the freezer compartment 106 is open or closed. If one or more of the switches 214, 216, 218 are open for a predefined period of time, the controller 202 may raise an alert, in an example.

The controller 202 may also receive information indicative of the preferred temperatures to maintain in the compartments 102, 104, 106. For instance, the controller 202 may receive a fresh food set point input 220 for determining the temperature at which the fresh food compartment 102 is set by a user, a drawer set point input 222 for determining the temperature at which the drawer compartment 104 is set by the user, and a freezer set point input 224 for determining the temperature at which the freezer compartment 106 is set by the user.

The controller 202 may also receive state information from other components as well. For example, the controller 202 may receive a damper state input 226 for monitoring the state of the damper. The controller 202 may also receive a defrost state input 228 for monitoring the state of the defrost. The controller 202 may also receive an ice maker state input 230 for monitoring the state of the ice maker. The controller 202 may also receive a power consumption input 232 for monitoring the power consumption of the various components of the refrigerator 100. The power consumption input 232 may be measured using a built-in power meter or may be estimated based on the current compressor state of the refrigerator 100 in an example.

Based on the received inputs, the controller 202 is configured to control various aspects of the operation of the refrigerator 100. For instance, the controller 202 may provide a compressor control 234 signal configured to control the operation of the compressor, an evaporator fan signal 236 for controlling the speed of the evaporator fan, a damper control signal 238 for controlling the operation of one or more dampers, and a defrost signal 240 for controlling one or more heaters for defrosting components where icing or condensation is not desired.

The controller 202 may also include a communications interface 242. The communications interface 242 may provide for wired and/or wireless communications between the controller 202 and external devices. For instance, the communications interface 242 may support wireless connections over protocols such as Wi-Fi, cellular, or BLUETOOTH, or wired connections such as via universal serial bus (USB) or Ethernet. The communications interface 242 may be used for various purposes, such as transferring information off the controller 202 to an external device, or receiving information from an external device to the controller 202.

In addition to the inputs to control the operation of the refrigerator 100 and the communications interface 242, the controller 202 may optionally be configured to include additional auxiliary sensors. These auxiliary sensors may be unnecessary for control of the operation of the refrigerator 100 but may be useful for diagnosing issues that may occur outside of normal operation.

In an example, the auxiliary sensors may include one or more image capture devices 244. The image capture devices 244 may include visible light cameras, infrared imaging cameras, 3D imaging devices such as light detection and ranging (LIDAR), or other forms of image capture device 244 such as wireless backscatter image detectors. The image capture devices 244 may be arranged within the compartments 102, 104, 106 to provide coverage of the internal spaces where customers may place food items. The image capture devices 244 may accordingly allow the controller 202 to receive information indicative of the presence and locations of items and within the compartments 102, 104, 106.

The image capture devices 244 may be placed in various manners. In some examples, the image capture devices 244 may be embedded inside one or more of top, side, rear, or bottom walls of the compartments 102, 104, 106, embedded inside doors or drawers to the compartments 102, 104, 106, or embedded within shelves of the refrigerator 100. In another example, the image capture devices 244 may be removable devices that are placed within the refrigerator 100 by a user and are plugged into the refrigerator 100 or are configured to wirelessly send image data top the refrigerator 100 (e.g., via the communications interface 242).

In another example, the auxiliary sensors may include one or more sound capture devices 246. The sound capture devices 246 may include hardware such as microphones or accelerometers. The sound capture devices 246 may be placed in various locations within the refrigerator 100, such as on the frame of the refrigerator 100, as well as on or nearby various components of the refrigerator 100 most likely to generate sounds, such as the fans, the compressor, the ice maker, etc. Several sound capture devices 246 may be placed throughout the refrigerator 100 to allow for location of sounds, e.g., by allowing for identification of where sounds are the loudest or when the sounds occur first.

Figure 3:
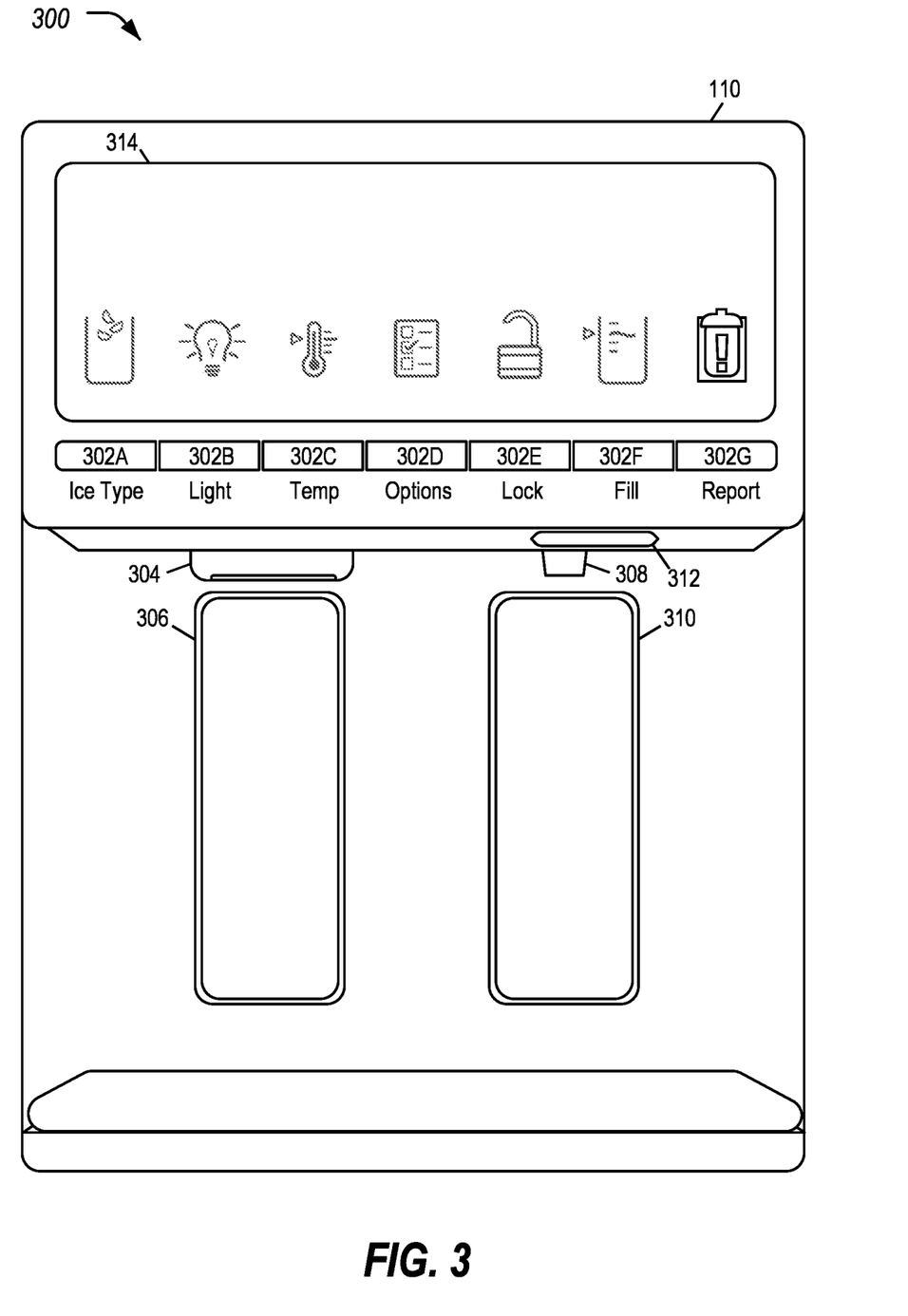
FIG. 3 illustrates an example detail of the control panel of the refrigerator of FIG. 1.

FIG. 3 illustrates an example detail 300 of the control panel 110. As shown in FIG. 3, and with confined reference to FIG. 2, the controller 202 may receive inputs from the control panel 110, allowing users to adjust the temperature and monitor the status of the refrigerator 100. The control panel 110 may show information such as the current temperature of the fresh food compartment 102 and or the freezer compartment 106 and may also show the temperature settings and any alarms or warnings. The user may adjust the temperature settings through buttons or a touch screen interface. Some refrigerators 100 also may allow users to control and monitor other features through the control panel 110. For example, some models have a vacation mode that turns off the cooling system to conserve energy while the refrigerator 100 is unoccupied. Other models have a door alarm that alerts the user if the door has been left open for an extended period of time (e.g., as detected based on the fresh food compartment door switch 214, drawer compartment switch 216, or freezer compartment switch 218).

As shown, the control panel 110 includes control buttons 302A-G for operating various functions (collectively control buttons 302). The control panel 110 also includes an ice dispenser 304 for the dispensing of ice from the ice maker responsive to pressure on an ice lever 306, and a water dispenser 308 for the dispensing of a quantity of water responsive to pressure on a water lever 310 or pressing a water dispense button 312. The control panel 110 may also include a display screen 314, that includes various elements that may be illuminated or not illuminated to illustrate the current mode or status of the refrigerator 100.

The control buttons 302 may include, for example, an ice type control button 302A for choosing between cubes or crushed ice, a light control button 302B for toggling lighting settings, a temperature control button 302C for selecting temperature settings to adjust the fresh food set point input 220, drawer set point input 222, and/or freezer set point input 224, an options control button 302D for configuring various features such as fast cool, ice maker on and off, or sabbath mode, a lock control button 302E for deactivating the control buttons 302 and the ice and dispensers 304, 308, a fill control button 302F for selecting the quantity of water to be dispensed from the water dispenser 308.

The control buttons 302 further include a report control button 302G. When a customer notices an issue with the refrigerator 100, the user may press the control button 302G to activate a reporting feature. This reporting feature may allow for the logging of the specific conditions when the issue is occurring. The logged conditions may be saved for post-processing and evaluation. The conditions may include the recording of information from the available sensors of the refrigerator 100 as well as the state and other auxiliary data available to the controller 202, such as that discussed with respect to FIG. 2.

It should be noted that while the report control button 302G is shown as integrated into the control buttons 302 of the control panel 110, this is merely an example. In other examples, the report control button 302G may be implemented as a submenu to the one of the other control buttons 302, such as under the options control button 302D. In yet another example, the report control button 302G may be implemented separately from the control panel 110, such as on the side of the refrigerator 100 or at another location on the refrigerator 100.

Figure 4A:
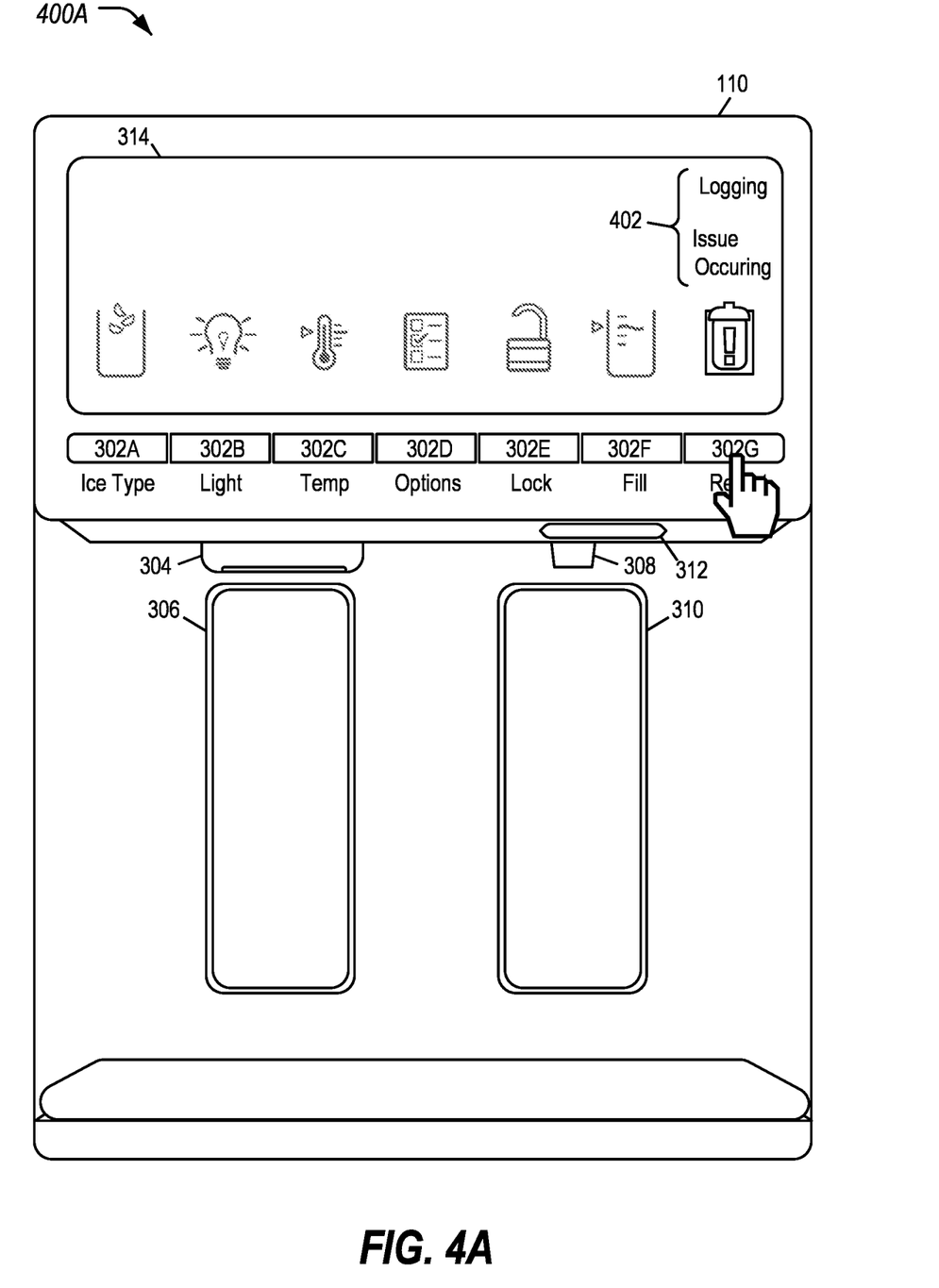
FIG. 4A illustrates an example of a user indicating that an issue is occurring with the refrigerator.

FIG. 4A illustrates an example 400A of a user indicating that an issue is occurring with the refrigerator 100. At the time when the issue is occurring, the customer may press the report control button 302G to activate the recording feature. This activation may trigger the controller 202 to begin to register the current conditions of the refrigerator 100. Additionally, an indication 402 may be displayed in the display screen 314 illustrating that the refrigerator 100 is now logging information that is being captured during the occurrence of the issue. For instance, the user may press the report control button 302G responsive to hearing an unusual noise emanating from the refrigerator 100.

Figure 4B:
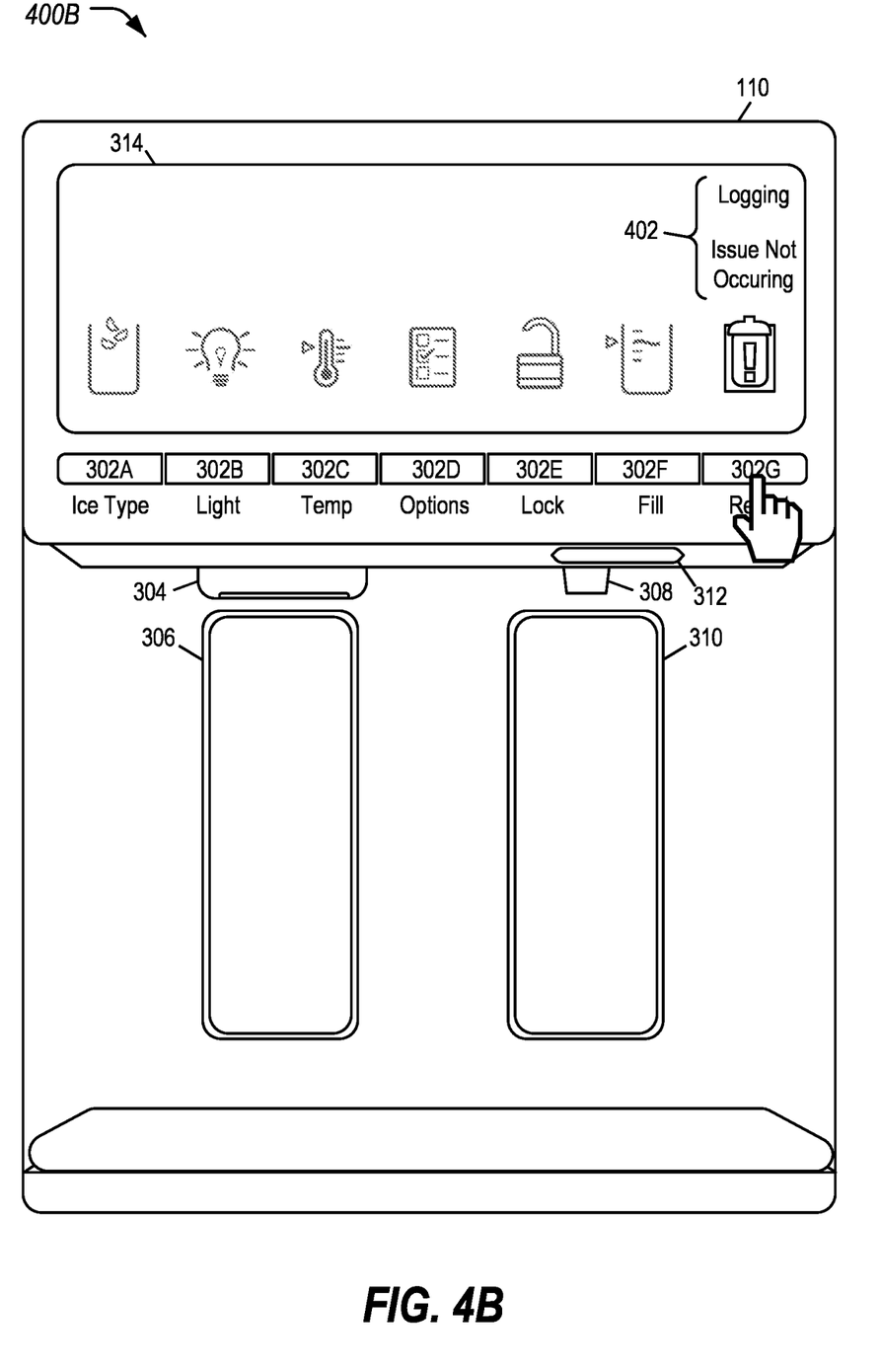
FIG. 4B illustrates an example of the user indicating that the issue has stopped occurring with the refrigerator.

FIG. 4B illustrates an example 400B of the user indicating that the issue has stopped occurring with the refrigerator 100. If the issue stops occurring, the customer may similarly use the report control button 302G to indicate the issue is no longer occurring. For instance, the user may press the report control button 302G responsive to noticing that the unusual noise is no longer emanating from the refrigerator 100. In such a case, the indication 402 may be updated to indicate that logging continues, but that the logged data is indicative of a case where the issue is no longer occurring. In doing so, the user may be able to provide a record of the operation of the refrigerator 100 that is annotated to indicate which recorded information was captured during the occurrence of the issue, as well as which recorded information was captured when the issue was not occurring. This annotated logging may be used to provide information to aid a service technician and/or an engineer to diagnose and resolve the issue.

Figure 5:
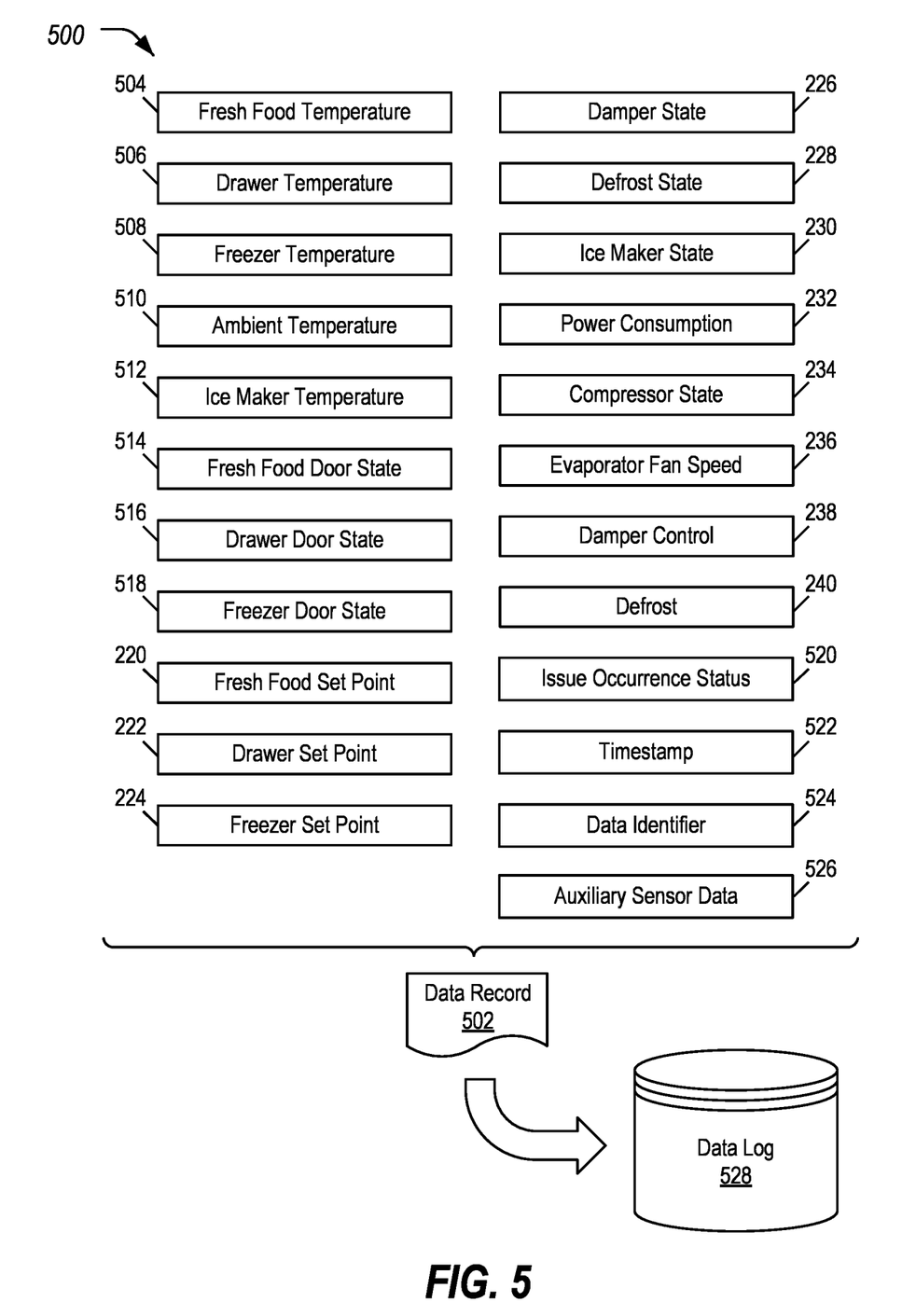
FIG. 5 illustrates an example of the elements that may be included in data records captured in the report mode.

FIG. 5 illustrates an example 500 of the elements that maybe included in data records 502 captured in the report mode. The data records 502 may include various aspects as mentioned above, such as a fresh food temperature 504 as captured by the fresh food temperature sensor 204, a drawer temperature 506 captured by the drawer temperature sensor 206, a freezer temperature 508 captured by the freezer temperature sensor 208, an ambient temperature 510 captured by the ambient temperature sensor 210, an ice maker temperature 512 measured by the ice maker temperature sensor 212, a fresh food door state 514 captured by the fresh food compartment door switch 214, a drawer door state 516 captured by the drawer compartment switch 216, a freezer door state 518 captured by freezer compartment switch 218, the fresh food set point input 220, the drawer set point input 222, the freezer set point input 224, the damper state input 226, the defrost state input 228, the ice maker state input 230, the power consumption input 232, the compressor control 234 indicative of the compressor state, the evaporator fan signal 236 indicative of the evaporator fan speed, any damper control signals 238 being sent, and any defrost signals 240 being sent.

The data records 502 may also include an issue occurrence status 520. The issue occurrence status 520 may be indicative of whether the data record 502 is indicating state information that was captured during the occurrence of the issue. For instance, the issue occurrence status 520 may be set to true responsive to the user selecting the report control button 302G to begin recording, and may be set to false (or true) responsive to the user additionally selecting the report control button 302G to toggle the status whether the issue is occurring, as shown in FIGS. 4A-4B. This may accordingly allow the data record 502 to be annotated by the user to indicate which data records 502 represent information when the issue was occurring, and which data records 502 represent information when the issue was not occurring.

The data records 502 may also include a timestamp 522 indicative of the time and/or date at which the data record 502 was captured. This may allow the data records 502 to be correlated with outside information for the same time, as well as to generally track when the issue occurred. For instance, if an issue manifests at the same time on different days, then that may be relevant in identifying the cause of the issue The data records 502 may also include one or more data identifiers 524. In an example, the data record 502 may include an identifier of a make and/or model of the refrigerator 100. In another example, the data record 502 may include an identifier of a serial number of the refrigerator 100.

The data records 502 may also include auxiliary sensor data 526. In an example, the refrigerator 100 may include data from the image capture devices 244 and/or sound capture devices 246 (if the refrigerator 100 is so equipped) to document further details of the issue. These additional sensors may allow the refrigerator 100 to capture aspects such as emanating sounds and/or the layout of items in the refrigerator 100. Sensor data from these additional sensors may be included in the data records 502 as auxiliary sensor data 526 to further aid in the diagnosis of issues.

The data records 502, as augmented, may be stored to a data log 528. The data log 528 may be maintained to a memory of the controller 202, for example. In one example, the controller 202 may periodically sample the state and inputs and may store the recent data records 502 in the data log 528 until a capacity is reached. This sample period may be every second, every minute, etc. As additional data records 502 are added, the oldest data records 502 may be deleted to stay within the capacity.

Figure 6:
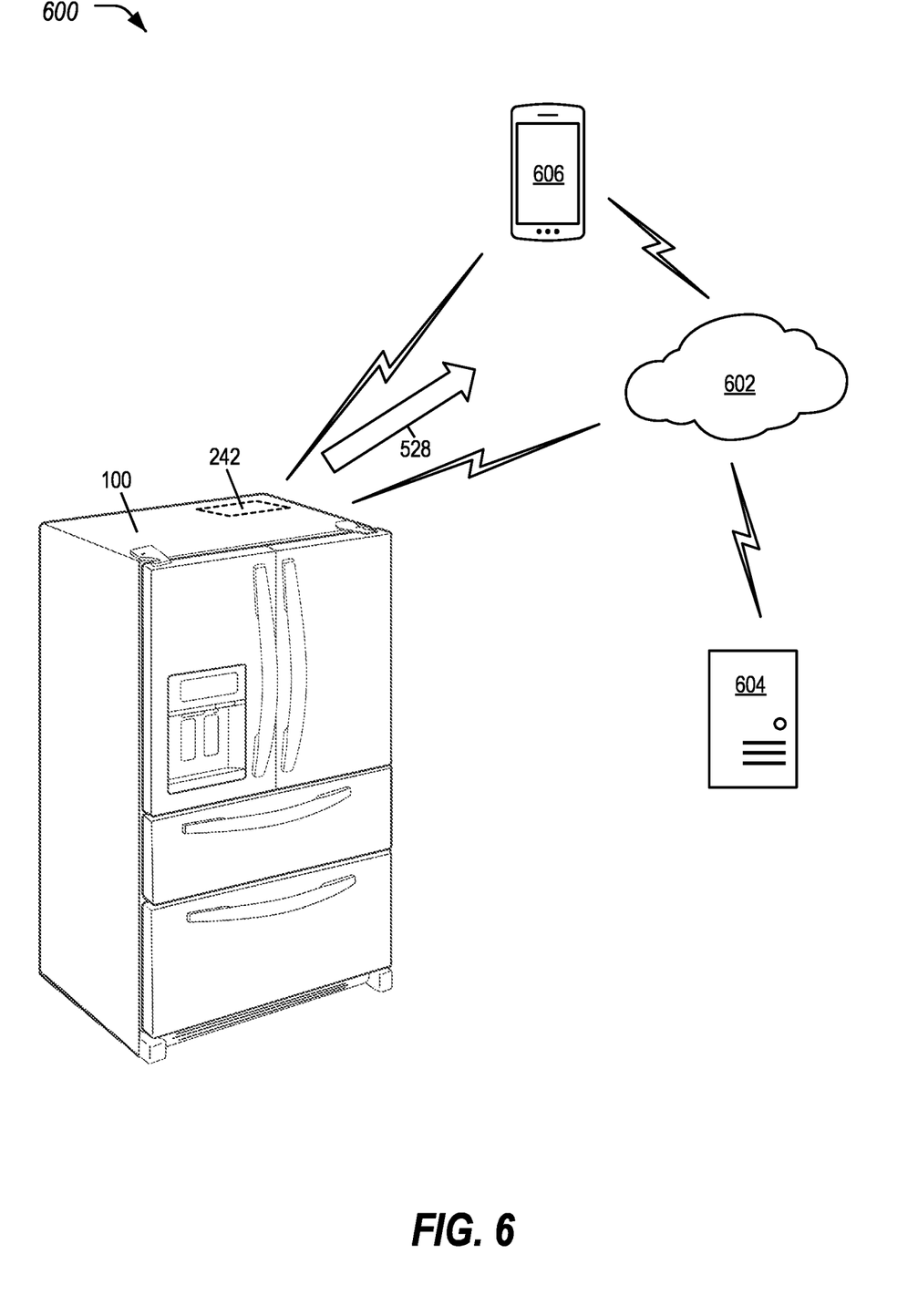
FIG. 6 illustrates an example of communication of the data log to remote devices for analysis.

FIG. 6 illustrates an example 600 of communication of the data log 528 to remote devices for analysis. The refrigerator 100 may be configured to utilize the communications interface 242 to communicate over a network 602, such as a Wi-Fi network or a cellular network, to which various remote devices are connected such as a remote server 604 and/or a smartphone 606. The refrigerator 100 may additionally or alternately be configured to communicate directly with the remote device, such as a direct connection to the smartphone 606 or other technician device in proximity to the refrigerator 100. Regardless of approach, the data log 528 may be provided to the remote device using the communications interface 242. This may allow a technician to read the data log 528, and analyze the data captured when the issue occurred as well as when the issue was not occurring.

Figure 7:
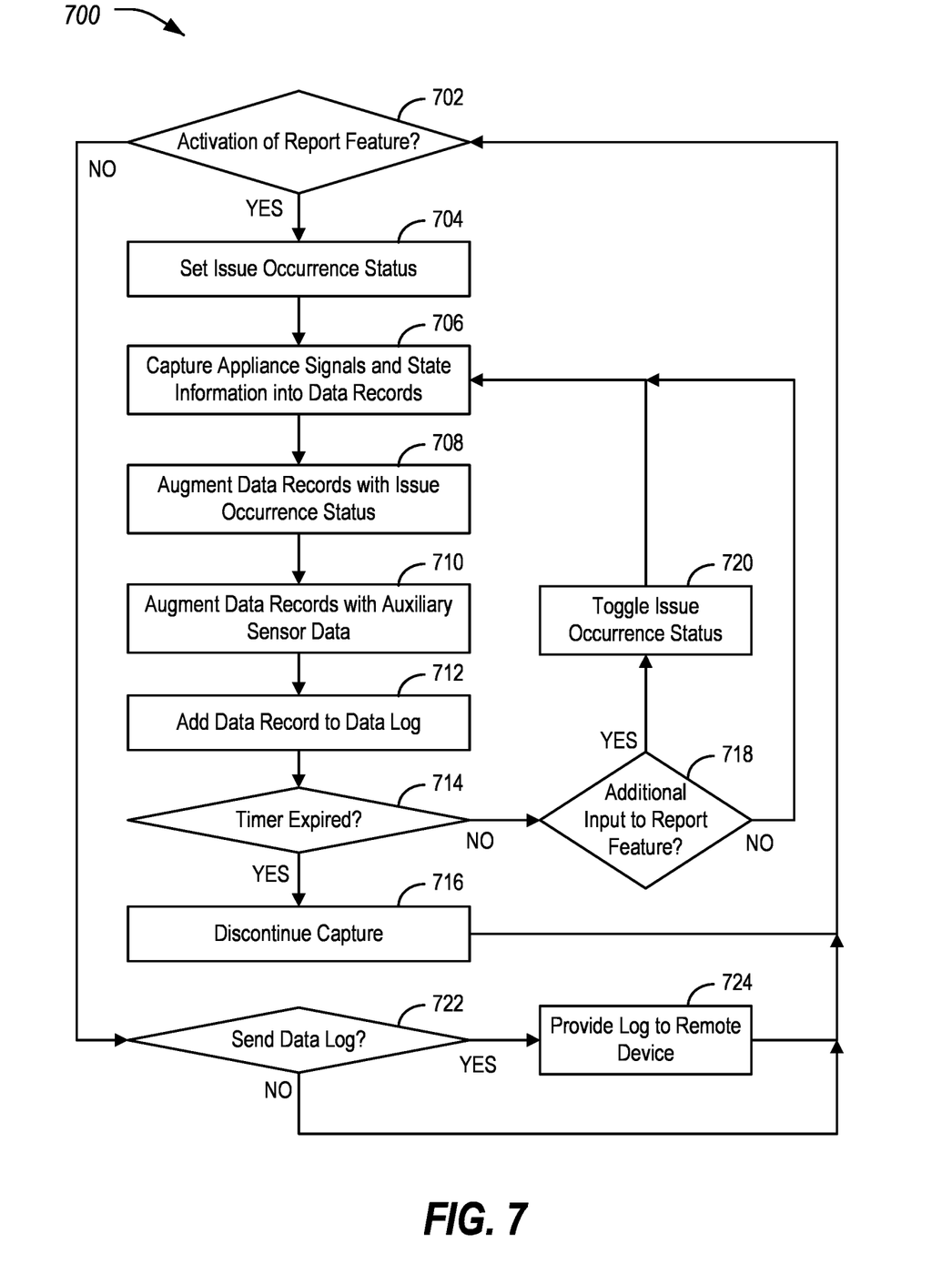
FIG. 7 illustrates an example process for the operation of the refrigerator implementing issue reporting functionality.

FIG. 7 illustrates an example process 700 for the operation of the refrigerator 100 implementing issue reporting functionality. In an example, the process 700 may be performed by the controller 202 in the context of the refrigerator 100 discussed in detail herein.

At operation 702, the controller 202 determines whether the report feature is activated. In an example, the controller 202 may receive selection of the report control button 302G from the control panel 110 of the refrigerator 100. If such a selection was received, control passes to operation 704.

At operation 704, the controller 202 sets the issue occurrence status 520. In an example, responsive to activation of the report feature, the controller 202 may set the issue occurrence status 520 to a value that indicates that an issue is occurring, such as true.

At operation 706, the controller 202 captures appliance signals and state information into a data record 502. In an example, the controller 202 may periodically capture appliance signals and state information into data records 502. An example of such capture is discussed with respect to FIG. 5. As shown in FIGS. 4A-4B, the controller 202 may also update the display screen 314 to provide an indication 402 illustrating that the refrigerator 100 is now logging information, as well as indicating the issue occurrence status 520. In another example, the controller 202 may log data regardless of whether an issue is noted by the user. This may allow for data before the user indicated the issue to be made available as well for analysis.

At operation 708, the controller 202 augments the data record 502 with the issue occurrence status 520. In an example, the controller 202 may include the issue occurrence status 520 in the data record 502, such that the data record 502 is annotated to indicate that it includes data captured contemporaneously with the occurrence of the issue.

At operation 710, the controller 202 augments the data record 502 with auxiliary sensor data 526, if available. In an example, the controller 202 may augment the data record 502 with audio captured from a sound capture device 246 internal to the refrigerator 100. In an example, the controller 202 may augment the data record 502 with image data captured from an image capture device 244 configured to image a compartment 102, 104, 106 of the refrigerator 100.

At operation 712, the controller 202 adds the data record 502 to the data log 528. For example, the controller 202 may store the data record 502 into the data log 528 augmented with a timestamp 522 of the data record 502.

At operation 714, the controller 202 determines whether the report timer has expired. In an example, the issue registering procedure may utilize a pre-defined a maximum time of registration, after which the data records 502 are automatically no longer registered. The timeframe for the registration may be preset into the refrigerator 100. If the timeout has elapsed, control passes to operation 716 to discontinue the capture of data record 502. After operation 716, control returns to operation 702.

If the timer at operation 714 has not elapsed, control proceeds to operation 718. At operation 718, the controller 202 determines whether additional input to the report feature has occurred. For instance, if the user again selects the report control button 302G, control passes to operation 720 to toggle the status of whether the issue is occurring, as shown in FIGS. 4A-4B (e.g., in this case to set the issue occurrence status 520 from true to false). This may accordingly allow the data records 502 to be annotated by the user to indicate which data records 502 represent information when the issue was occurring, and which data records 502 represent information when the issue was not occurring. The indication 402 displayed to the display screen 314 may also be updated to indicate the updated issue occurrence status 520. In some examples, each time the report control button 302G is pressed during the capture the status of the issue occurrence status 520 is again toggled. In some examples, each time the report control button 302G is pressed during the capture resets the timer to extend the time until the capture is completed. After operation 720, control proceeds back to operation 706. If no such input occurs at operation 718, control passes from operation 718 to operation 706.

Returning to operation 702, if the report feature is not activated, control proceeds to operation 722. At operation 722, the controller 202 determines whether to send the data log 528 to a remote device. In an example, the controller 202 may determine whether a remote device, such as a remote server 604 or smartphone 606 has connected to the communications interface 242 of the controller 202. If so, control proceeds to operation 724 to send the data log 528 to the remote device. After operation 724, control returns to operation 702. If no such device is connected at operation 722, control passes from operation 722 to operation 702.

Thus, at the time when an issue is occurring, a customer may press the report control button 302G to activate a report feature. This activation may trigger the controller 202 to register the current conditions of the refrigerator 100. If the issue stops occurring, the customer may similarly use the report control button 302G to indicate the issue is no longer occurring. By capturing such information, the refrigerator 100 may provide documentation of the issue to a remote device to help an engineer diagnose and solve the issue. This documentation (e.g., video, sound, temperatures conditions, etc., when the issue occurred) may allow the service technician to understand the circumstances at the customer site, which may aid in diagnosing, understanding, and correcting the issue.

Figure 8:
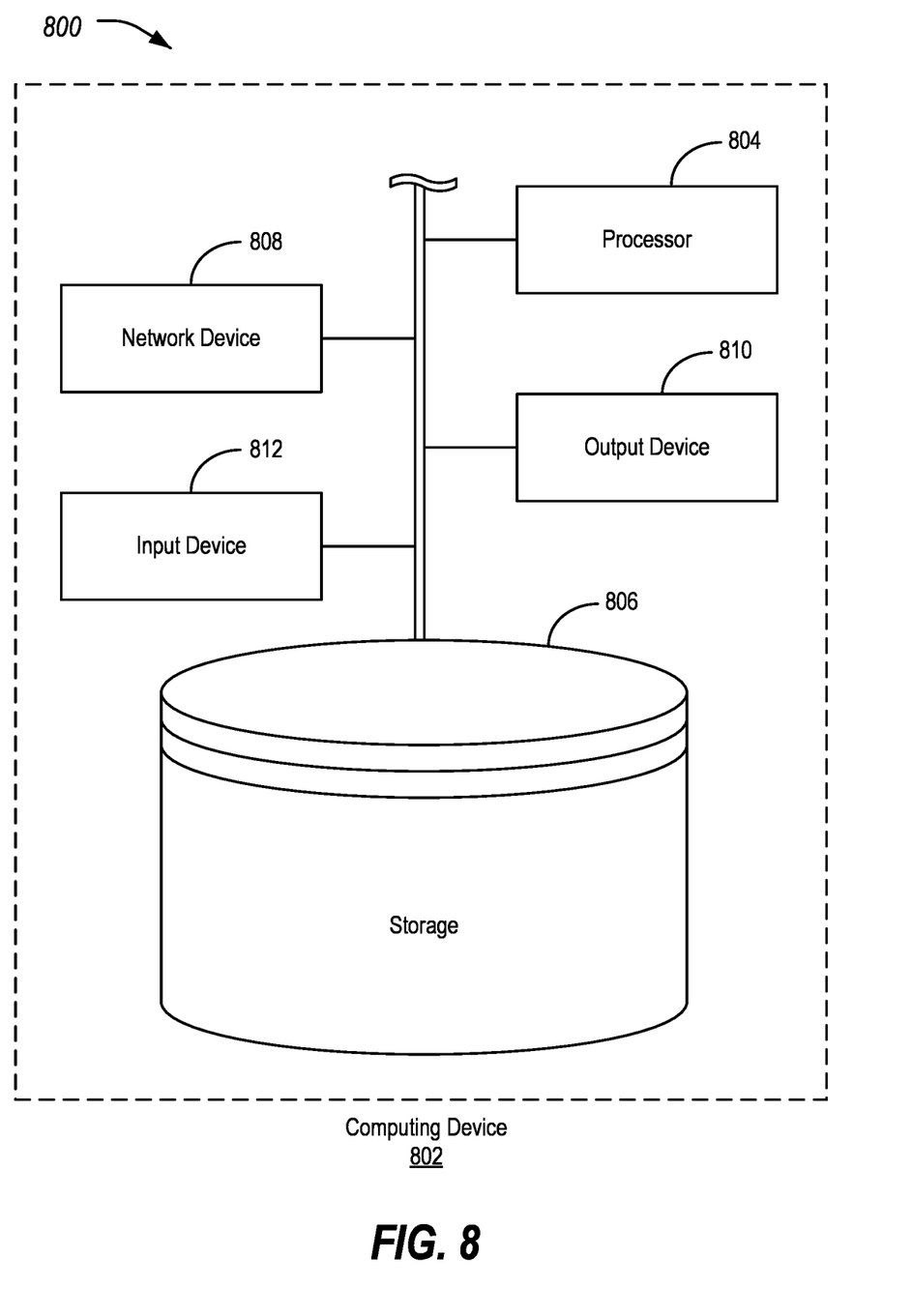
FIG. 8 illustrates an example of a computing device for implementing issue reporting functionality.

FIG. 8 illustrates an example 800 of a computing device 802 for implementing issue reporting functionality. Referring to FIG. 8, and with reference to FIGS. 1-7, the controller 202 may be an example of such a computing device 802. As shown, the computing device 802 may include a processor 804 that is operatively connected to a storage 806, a network device 808, an output device 810, and an input device 812. It should be noted that this is merely an example, and computing devices 802 with more, fewer, or different components may be used.

The processor 804 may include one or more integrated circuits that implement the functionality of a central processing unit (CPU) and/or graphics processing unit (GPU). In some examples, the processors 804 are a system on a chip (SoC) that integrates the functionality of the CPU and GPU. The SoC may optionally include other components such as, for example, the storage 806 and the network device 808 into a single integrated device. In other examples, the CPU and GPU are connected to each other via a peripheral connection device such as peripheral component interconnect (PCI) express or another suitable peripheral data connection. In one example, the CPU is a commercially available central processing device that implements an instruction set such as one of the x86, ARM, Power, or microprocessor without interlocked pipeline stages (MIPS) instruction set families.

Regardless of the specifics, during operation the processor 804 executes stored program instructions that are retrieved from the storage 806. The stored program instructions, accordingly, include software that controls the operation of the processors 804 to perform the operations described herein. The storage 806 may include both non-volatile memory and volatile memory devices. The non-volatile memory includes solid-state memories, such as not AND (NAND) flash memory, magnetic and optical storage media, or any other suitable data storage device that retains data when the system is deactivated or loses electrical power. The volatile memory includes static and dynamic random-access memory (RAM) that stores program instructions and data during operation of the refrigerator 100.

The GPU may include hardware and software for display of at least two-dimensional (2D) and optionally three-dimensional (3D) graphics to the output device 810. The output device 810 may include a graphical or visual display device, such as an electronic display screen, projector, printer, or any other suitable device that reproduces a graphical display. As another example, the output device 810 may include an audio device, such as a loudspeaker or headphone. As yet a further example, the output device 810 may include a tactile device, such as a mechanically raiseable device that may, in an example, be configured to display braille or another physical output that may be touched to provide information to a user.

The input device 812 may include any of various devices that enable the computing device 802 to receive control input from users. Examples of suitable input devices that receive human interface inputs may include keyboards, mice, trackballs, touchscreens, voice input devices, graphics tablets, and the like.

The network devices 808 may each include any of various devices that enable the refrigerator 100 to send and/or receive data from external devices over networks. Examples of suitable network devices 808 include an Ethernet interface, a Wi-Fi transceiver, a cellular transceiver, or a BLUETOOTH or BLUETOOTH low energy (BLE) transceiver, or other network adapter or peripheral interconnection device that receives data from another computer or external data storage device, which can be useful for receiving large sets of data in an efficient manner.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to strength, durability, life cycle, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. An appliance implementing an issue reporting function, comprising:
a controller including a hardware processor and a memory, configured to
responsive to a first press of a control button of the appliance indicating user activation of a report feature indicating that an issue is being experienced by the appliance, capture appliance signals and state information into data records;
receive a second press of the control button indicating that the issue is no longer occurring;
responsive to deactivation of the report feature, discontinue the capture of the appliance signals and the state information;
augment the data records captured after the first press of the control button and before the second press of the control button with an issue occurrence status indicating that the issue is occurring;
augment the data records captured after the second press of the control button with an issue occurrence status indicating that the issue is no longer occurring; and
send the data records to a remote device for analysis.

2. The appliance of claim 1, wherein the controller is further configured to deactivate the capture responsive to expiration of a predefined timeout period after the activation of the report feature.

3. The appliance of claim 1, wherein the controller is further configured to augment the data records with audio captured from a microphone or accelerometer internal to the appliance.

4. The appliance of claim 1, wherein the controller is further configured to augment the data records with image data captured from a camera configured to image a food compartment of the appliance.

5. The appliance of claim 1, wherein the remote device is a smartphone or a cloud server.

6. The appliance of claim 1, wherein the controller is further configured to:
toggle the issue occurrence status each additional time the control button is pressed after the second press; and
augment the data records based on the toggle with the issue occurrence status indicating whether or not the issue is occurring.

7. The appliance of claim 6, wherein the controller is further configured to:
deactivate the capture responsive to expiration of a predefined timeout period after the activation of the report feature; and
reset the predefined timeout period to extend the time until the capture is completed each time the control button is pressed during the capture.

8. A method for implementing an issue reporting function of an appliance, comprising:
responsive to a first press of a control button of the appliance indicating user activation of a report feature indicating that an issue is being experienced by the appliance, periodically capturing appliance signals and state information into data records;
receiving a second press of the control button indicating that the issue is no longer occurring;
responsive to deactivation of the report feature, discontinuing the capturing of the appliance signals and the state information;
augmenting the data records captured after the press of the control button and before the second press of the control button with an issue occurrence status indicating that the issue is occurring;
augmenting the data records captured after the second press of the control button with an issue occurrence status indicating that the issue is no longer occurring; and
sending the data records to a remote device for analysis.

9. The method of claim 8, further comprising deactivating the capture responsive to expiration of a predefined timeout period after the activation of the report feature.

10. The method of claim 8, further comprising augmenting the data records with audio captured from a microphone or accelerometer internal to the appliance.

11. The method of claim 8, further comprising augmenting the data records with image data captured from a camera configured to image a food compartment of the appliance.

12. The method of claim 8, wherein the remote device is a smartphone or a cloud server.

13. The method of claim 8, further comprising:
toggling the issue occurrence status each additional time the control button is pressed after the second press;
augmenting the data records based on the toggle with the issue occurrence status indicating whether or not the issue is occurring.

14. The method of claim 13, further comprising:
deactivating the capture responsive to expiration of a predefined timeout period after the activation of the report feature; and
resetting the predefined timeout period to extend the time until the capture is completed each time the control button is pressed during the capture.

15. A non-transitory computer-readable medium comprising instructions for implementing an issue reporting function for an appliance that, when executed by a controller of the appliance, cause the controller to perform operations including to:
responsive to a first press of a control button of the appliance indicating user activation of a report feature indicating that an issue is being experienced by the appliance, periodically capture appliance signals and state information into data records;
receive a second press of the control button indicating that the issue is no longer occurring;
responsive to deactivation of the report feature, discontinue the capture of the appliance signals and the state information;
augment the data records captured after the press of the control button and before the second press of the control button with an issue occurrence status indicating that the issue is occurring;
augment the data records captured after the second press of the control button with an issue occurrence status indicating that the issue is no longer occurring; and
send the data records to a remote device for analysis.

16. The medium of claim 15, further comprising instructions that, when executed by the controller of the appliance, cause the controller to perform operations including to deactivate the capture responsive to expiration of a predefined timeout period after the activation of the report feature.

17. The medium of claim 15, further comprising instructions that, when executed by the controller of the appliance, cause the controller to perform operations including to augment the data records with audio captured from a microphone or accelerometer internal to the appliance.

18. The medium of claim 15, further comprising instructions that, when executed by the controller of the appliance, cause the controller to perform operations including to augment the data records with image data captured from a camera configured to image a food compartment of the appliance.

19. The medium of claim 15, further comprising instructions that, when executed by the controller of the appliance, cause the controller to perform operations including to:
- toggle the issue occurrence status each additional time the control button is pressed after the second press; and
- augment the data records based on the toggle with the issue occurrence status indicating whether or not the issue is occurring.

20. The medium of claim 19, further comprising instructions that, when executed by the controller of the appliance, cause the controller to perform operations including to:
- deactivate the capture responsive to expiration of a predefined timeout period after the activation of the report feature; and
- reset the predefined timeout period to extend the time until the capture is completed each time the control button is pressed during the capture.

\* \* \* \* \*